May 9, 1939.  T. B. DOE ET AL  2,157,692
POWER TRANSMISSION
Filed April 29, 1936  2 Sheets-Sheet 1
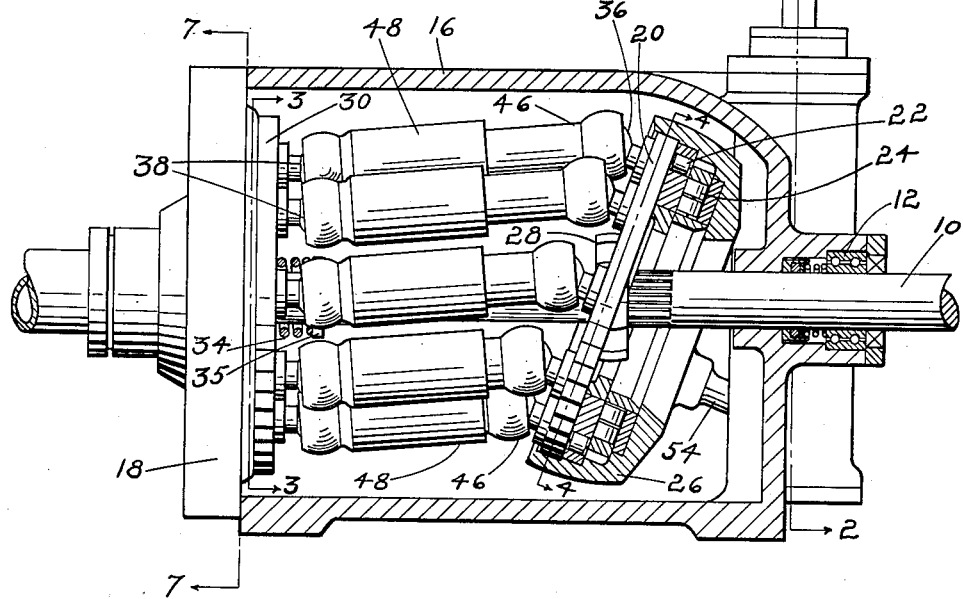
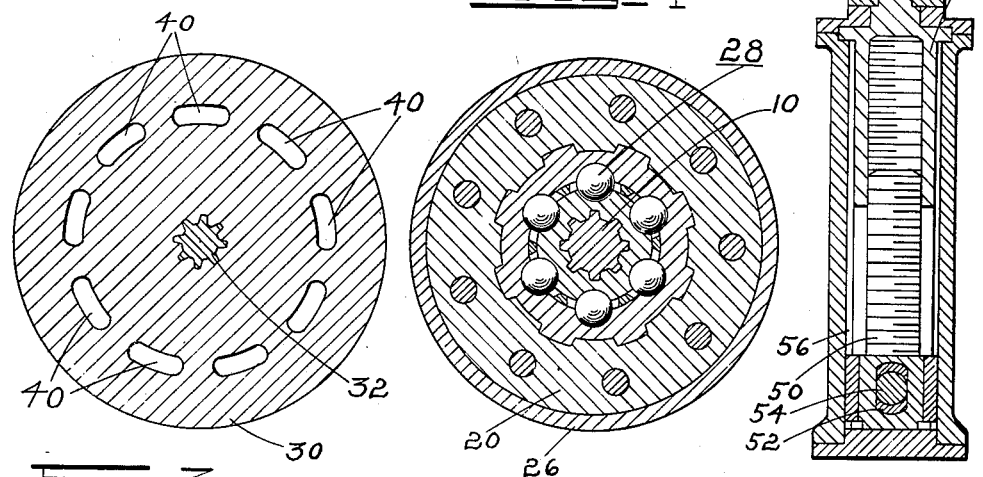
INVENTORS
THOMAS B. DOE + EDWIN L. ROSE
BY
Ralph L. Tweedale
ATTORNEY

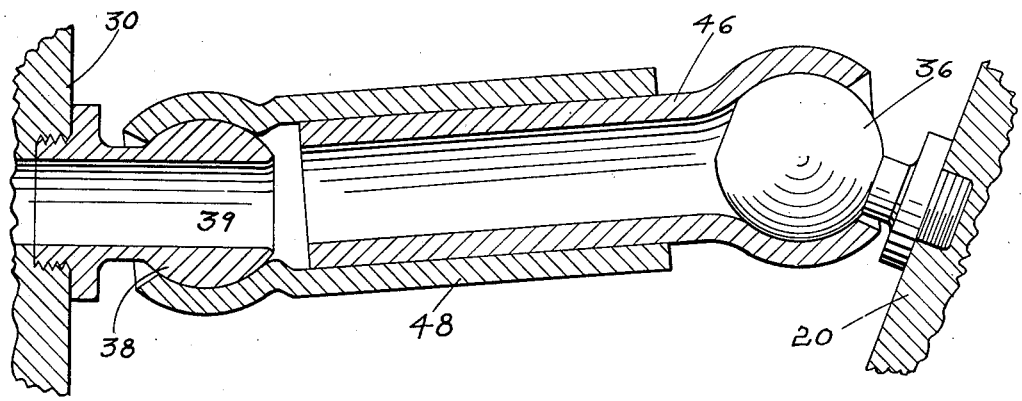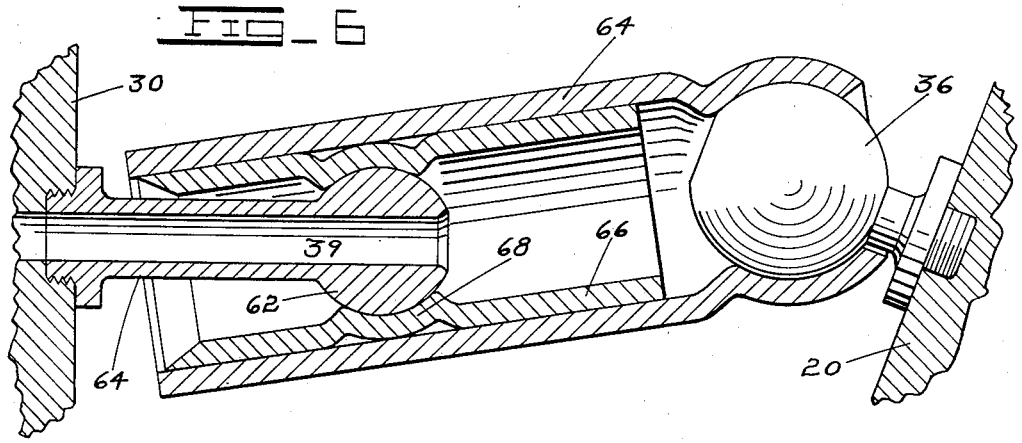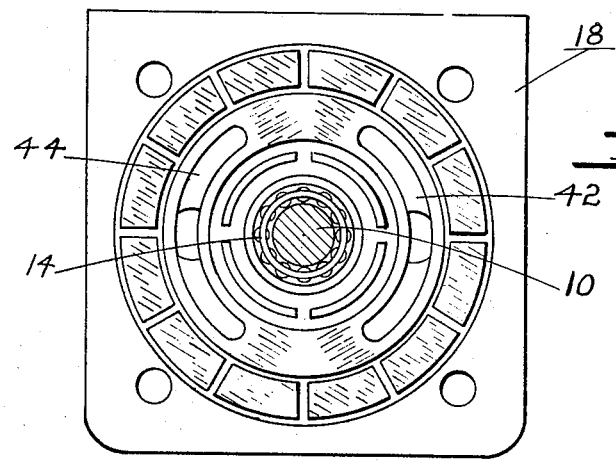

Patented May 9, 1939

2,157,692

UNITED STATES PATENT OFFICE 2,157,692

POWER TRANSMISSION

Thomas B. Doe, New York, N. Y., and Edwin L. Rose, Waterbury, Conn., assignors to The Waterbury Tool Company, Waterbury, Conn., a corporation of Connecticut Application April 29, 1936, Serial No. 76,961

14 Claims. (Cl. 103—162)

This invention relates to power transmissions and particularly to those of the fluid type of which a common form comprises generally two or more fluid pressure energy translating devices, one of which may function as a pump and another as a motor. One class of apparatus of this character employs expansible chamber forming means such as a plurality of pistons reciprocating in cylinders; a suitable motion converting means between the reciprocating pistons and a rotating shaft being provided, together with suitable valving means for controlling the admission and exhaust of fluid to and from the cylinders. The motion converting means usually includes a connecting rod or its equivalent for each piston, which is pivotally connected to the piston and to a part moving with the rotary shaft. Devices of this character have heretofore transmitted force between the piston and the fluid under pressure by means of the piston head which, due to its reciprocation in a relatively fixed cylinder, has required a connecting rod or equivalent to transmit force between the rotary shaft and the piston head.

It is an object of the present invention to construct a fluid pressure energy translating device wherein a pair of telescoping sleeves are provided forming an expansible chamber in which the fluid pressure is transmitted directly to a pivot member without the interposition of a piston head between the fluid under pressure and the pivot member.

A further object is to provide a device of this character wherein the connecting rod or its equivalent is eliminated as an element separate from the expansible chamber forming means.

A further object is to provide a device of this character wherein a plurality of cylinders are grouped around a central rotating shaft with their axes generally parallel to the shaft and a member constrained to move at an inclination to the shaft axis causes reciprocation of a cooperating set of cylindrical elements telescopically related to the first set, wherein the fluid pressure forces acting on the cylindrical elements are substantially balanced in all directions.

Further objects and advantages of the present invention will be apparent from the following description, reference being had to the accompanying drawings wherein a preferred form of the present invention is clearly shown.

In the drawings:

Fig. 1 is a side view partly in section of a fluid pressure energy translating device embodying one form of the present invention.

Fig. 2 is a cross section on line 2—2 of Fig. 1.

Fig. 3 is a cross section on line 3—3 of Fig. 1.

Fig. 4 is a cross section on line 4—4 of Fig. 1.

Fig. 5 is a longitudinal cross section showing the construction of the expansible chamber mechanism.

Fig. 6 is a view corresponding to Fig. 5 showing a modified form of the expansible chamber mechanism.

Fig. 7 is a cross section on line 7—7 of Fig. 1.

In the form of the invention illustrated a main shaft 10 is journalled in bearings 12 and 14 (Fig. 7) in a casing 16 and a valve plate 18 respectively. A plate or ring 20 is journalled on roller bearings 22 and 24 in a tilting box 26, the latter being mounted on trunnions, not shown, to oscillate on a horizontal axis perpendicular to the shaft 10. The ring 20 is connected to the shaft 10 through the medium of a universal joint 28 (Fig. 4) which may be of any suitable construction and is illustrated as of the constant velocity type shown in Patent 1,665,280. A commutator plate 30 is splined to the shaft 10 at 32 (Fig. 3) and yieldingly urged against the valve plate 18 by a spring 34 abutting against a collar 35 on the shaft 10.

The ring 20 and the commutator plate 30 each carry a series of pivot members 36 and 38 respectively, forming part of an expansible chamber mechanism illustrated in Fig. 5. The pivot members 38 are provided with fluid passages 39 therethrough leading to commutating ports 40 (Fig. 3) formed in the plate 30 and which co-act with valve ports 42 and 44 (Fig. 7) in the valve plate 18, one of which may serve for supplying fluid to the expansible chambers in turn and the other for the exhaustion of fluid therefrom.

The expansible chambers are formed by means of telescoping sleeves 46 and 48 having their respective outer ends embracing a spherical surface on the members 36 and 38 respectively. The sleeves 46 and 48 are preferably secured to the spherical pivot members 36 and 38 by deforming the ends of the sleeves to embrace the pivot members as illustrated.

Control of the position of the tilting box 26 is obtained by means of a threaded stem 50 (Fig. 2) having a pivoting and sliding connection at 52 with an operating stud 54 formed on the tilting box 26. Stem 50 is prevented from turning about its axis by guides 56 and cooperates with an internally threaded operating member 58 having a projecting stem 60, by the rotation of which, the stem 50 may be moved up and down to vary the angle of the tilting box 26 and the ring 20 with the shaft 10.

The mechanism above described may be used either for a pump or a fluid motor and may be associated with one or more fluid pressure energy translating devices of a similar or other design to provide a power transmission mechanism.

In operation considering the mechanism of Fig. 1 as a variable displacement pump, the casing 16 and the expansible chambers therein being filled with a suitable power transmission fluid such as lubricating oil and the shaft 10 being connected to a prime mover and ports 42 and 44 being connected to suitable fluid supply and delivery conduits, rotation of the shaft 10 causes rotation of the ring 20 in the plane of the tilting box 26 and rotation of the commutating plate 30 in a plane perpendicular to the shaft 10. If the tilting box be moved to a position inclined to the shaft 10, rotation of the ring 20 and plate 30 causes alternate relative reciprocation between the sleeves 46 and 48, withdrawing fluid from one of the valve ports in valve plate 18 and delivering fluid to the other of the valve ports. The stroke of the sleeves 46 with respect to the sleeves 48 may be varied by varying the inclination of the tilting box 26 so that the quantity of fluid pumped per revolution of the shaft 10 may be varied both in direction and amount to any value desired within the limits of the capacity of the machine.

The diameter of the spherical surface of the pivot members 36 and 38 is preferably so related to the internal diameter of the sleeve 48 as to completely balance the fluid pressures axially along the sleeves 46 and 48. Thus, the diameters of the spherical pivot members may be very slightly in excess of the internal diameter of the sleeve member 48, and the minimum diameter of the internal spherical surface of the sleeve in contact with the pivot member may be slightly less than the internal diameter of the sleeve 48, these diameters being so evaluated with regard to the pressure drop in the film of fluid around the spherical surface of the pivot members that the resultant axial force caused by fluid pressures on the sleeve is zero or at least relatively small.

In the form of the expansible chamber illustrated in Fig. 6 wherein corresponding reference characters indicate corresponding parts in the mechanism previously described, the pivot member 62 is formed with a relatively long neck 64 so that the center of the spherical surface is spaced from the commutator plate 30 by a substantial amount. The sleeve 64 embraces the pivot member 36 and extends beyond the pivot member 62 to a point very close to the commutator plate 30. A sleeve 66 is formed so as to be capable of sliding completely within the sleeve 64 and includes at substantially its mid-portion a spherical section 68 embracing the spherical surface of the pivot 62.

The operation of this form of the invention is identical with that of the form previously described except that the balancing of the axial thrust caused by fluid pressure on the sleeve 66 cannot be as complete as in the form shown in Fig. 5. The form shown in Fig. 6, however, presents the advantage particularly in high speed machines that the centrifugal force exerted on the sleeves 64 and 66 is partially balanced by the overhang of the sleeves 64 and 66 to the left of the spherical surface of the pivot member 62, thus reducing any tendency for one sleeve to cock within the other, that is for their axes to become misaligned.

While the invention has been illustrated as embodied in a variable displacement machine having a revolving cylinder group, it is apparent that its advantages may be derived from other arrangements such as the substitution of a fixed angle box for the tilting box, or the arrangement of the cylinder group to be stationary while the valve plate and tilting or angle box revolves.

While the form of embodiment of the invention as herein disclosed, constitutes a preferred form, it is to be understood that other forms might be adopted, all coming within the scope of the claims which follow.

What is claimed is as follows:

1. A fluid pressure energy translating device comprising in combination a pair of telescoping members forming a cylindrical expansible chamber, means forming a pivotal mounting for each of said members, each of said means including a member at least partly of circular cross section exposed to the fluid pressure within said chamber over a projected area substantially equal to the cross sectional area of said chamber, relatively rotatable members forming a driving member and a reaction member, and means for converting rotary motion of said driving member into relative reciprocation of said telescoping members, or vice versa.

2. A fluid pressure energy translating device comprising in combination a pair of telescoping members forming a cylindrical expansible chamber, means forming a pivotal mounting for each of said members, each of said means including a member having a portion with a spherical surface exposed to the fluid pressure within said chamber over a projected area substantially equal to the cross sectional area of said chamber, relatively rotatable members forming a driving member and a reaction member, and means for converting rotary motion of said driving member into relative reciprocation of said telescoping members, or vice versa.

3. A fluid pressure energy translating device comprising in combination a pair of telescoping members forming a cylindrical expansible chamber, means forming a pivotal mounting for each of said members, each of said means including a member having a portion with a spherical surface of a diameter approximately the diameter of said chamber exposed to the fluid pressure within said chamber over a projected area substantially equal to the cross sectional area of said chamber, relatively rotatable members forming a driving member and a reaction member, and means for converting rotary motion of said driving member into relative reciprocation of said telescoping members, or vice versa.

4. A fluid pressure energy translating device comprising in combination a plurality of pairs of telescoping members forming a plurality of cylindrical expansible chambers, means forming a pivotal mounting for each of said members, each of said means including a member having a portion with a spherical surface exposed to the fluid pressure within said chamber over a projected area substantially equal to the cross sectional area of said chamber, relatively rotatable members forming a driving member and a reaction member, and means including a member for maintaining the pivotal mountings for one of the members of each pair in a plane inclined to the axis of the driving member for converting rotary motion of said driving member into relative reciprocation of said telescoping members, or vice versa.

5. A fluid pressure energy translating device comprising in combination a plurality of pairs of telescoping members forming a plurality of cylindrical expansible chambers, means forming a pivotal mounting for each of said members, each of said means including a member having a portion with a spherical surface exposed to the fluid pressure within said chamber over a projected area substantially equal to the cross sectional area of said chamber, relatively rotatable members forming a driving member and a reaction member, and means including a member for maintaining the pivotal mountings for one of the members of each pair in a plane inclined to the axis of the driving member for converting rotary motion of said driving member into relative reciprocation of said telescoping members, or vice versa, and valve means operated by the driving member for controlling the admission and exhaust of fluid to and from said chambers.

6. A fluid pressure energy translating device comprising in combination a plurality of pairs of telescoping tubular members forming a plurality of cylindrical expansible chambers, said members each having approximately constant diameter throughout their length, means forming a pivotal mounting for each of said members at respectively opposite ends of each and immediately adjacent the tubular telescoping portion thereof, relatively rotatable members forming a driving member and a reaction member, and means including a member for maintaining the pivotal mountings for one of the tubular members of each pair in a plane inclined to the axis of the driving member for converting rotary motion of said driving member into relative reciprocation of said telescoping members, or vice versa.

7. A fluid pressure energy translating device comprising in combination a plurality of pairs of telescoping tubular members forming a plurality of cylindrical expansible chambers, said members each having approximately constant diameter throughout their length, means forming a pivotal mounting for each of said members at respectively opposite ends of each and immediately adjacent the tubular telescoping portion thereof, relatively rotatable members forming a driving member and a reaction member, and means including a member for maintaining the pivotal mountings for one of the tubular members of each pair in a plane inclined to the axis of the driving member for converting rotary motion of said driving member into relative reciprocation of said telescoping members, or vice versa, and valve means operated by the driving member for controlling the admission and exhaust of fluid to and from said chambers.

8. A fluid pressure energy translating device comprising in combination a pair of telescoping sleeves each having open ends, a member at least partly of circular cross section at the outer end of one of said sleeves and forming a combined closure for the open end of the sleeve and a pivotal joint, a member at least partly of circular cross section at the outer end of the other sleeve and forming a combined fluid delivery conduit and pivotal joint, and means associated with said members for imparting relative reciprocatory motion to said sleeves.

9. A fluid pressure energy translating device comprising in combination a plurality of pairs of telescoping sleeves each having open ends, a member at least partly of circular cross section associated with one sleeve of each of said pairs and forming a combined closure for the open end of the sleeve and a pivotal joint, a member at least partly of circular cross section at the outer end of the other sleeve of each of said pairs and forming a combined fluid delivery conduit and pivotal joint means for imparting rotation to said sleeves about an axis parallel to the sleeve axes, and means for imparting reciprocatory motion to one sleeve of each pair concurrently with the rotation thereof, said sleeves extending outwardly beyond the pivotal joint for at least partially counterbalancing the effect of centrifugal force tending to move the sleeve axes out of alignment.

10. A fluid pressure energy translating device comprising in combination a pair of telescoping sleeves each having open ends, a member having a spherical surface at the outer end of one of said sleeves and forming a combined closure for the open end of the sleeve and a pivotal joint, a member at least partly of circular cross section at the outer end of the other sleeve and forming a combined fluid delivery conduit and pivotal joint and means associated with said members for imparting relative reciprocatory motion to said sleeves.

11. A fluid pressure energy translating device comprising in combination a plurality of pairs of telescoping sleeves each having open ends, a member having a spherical surface associated with one sleeve of each pair and forming a combined closure for the open end of the sleeve and a pivotal joint, a member at least partly of circular cross section at the outer end of the other sleeve of each of said pairs and forming a combined fluid delivery conduit and pivotal joint means for imparting rotation to said sleeves about an axis parallel to the sleeve axes, and means for imparting reciprocatory motion to one sleeve of each pair concurrently with the rotation thereof, said sleeves extending outwardly beyond the pivotal joint for at least partially counterbalancing the effect of centrifugal force tending to move the sleeve axes out of alignment.

12. A fluid pressure energy translating device comprising in combination a first set of tubular members, a set of ball members each closing one end of a tubular member and forming therewith a pivotal joint, a second set of tubular members telescopically engaged with the first set to form a plurality of expansible chambers, a set of ball members each engaging one end of each tubular member of the second set to form therewith a pivotal joint and having a fluid delivery passage therethrough, both sets of ball members being in unobstructed contact with the fluid in said chambers over substantially their full diameter, means for causing relative reciprocatory motion of said tubular members and valve means for controlling the ingress and egress of fluid through said delivery passages.

13. A fluid pressure energy translating device comprising in combination a first set of tubular members, a set of ball members each closing one end of a tubular member and forming therewith a pivotal joint, a second set of tubular members telescopically engaged with the first set to form a plurality of expansible chambers, a set of ball members each engaging one end of each tubular member of the second set to form therewith a pivotal joint and having a fluid delivery passage therethrough, both sets of ball members being in unobstructed contact with the fluid in said chambers, means for causing relative reciprocatory motion of said tubular members and valve means for controlling the ingress and egress of fluid through said delivery passages.

14. A fluid pressure energy translating device comprising in combination a pair of telescoping tubular members forming a cylindrical expansible chamber, means forming a pivotal mounting for each of said members, said means including a pivot member having a spherical outer surface portion of a diameter approximating the diameter of said chamber and a cooperating spherical portion on the tubular member deformed to permanently embrace the pivot member on both sides of a diametral plane passing through the center of the sphere and perpendicular to the chamber axis, relatively rotatable members forming a driving member and a reaction member, and means for converting rotary motion of said driving member into relative reciprocation of said telescoping members, or vice versa.

EDWIN L. ROSE.
THOMAS B. DOE.